UNITED STATES PATENT OFFICE.

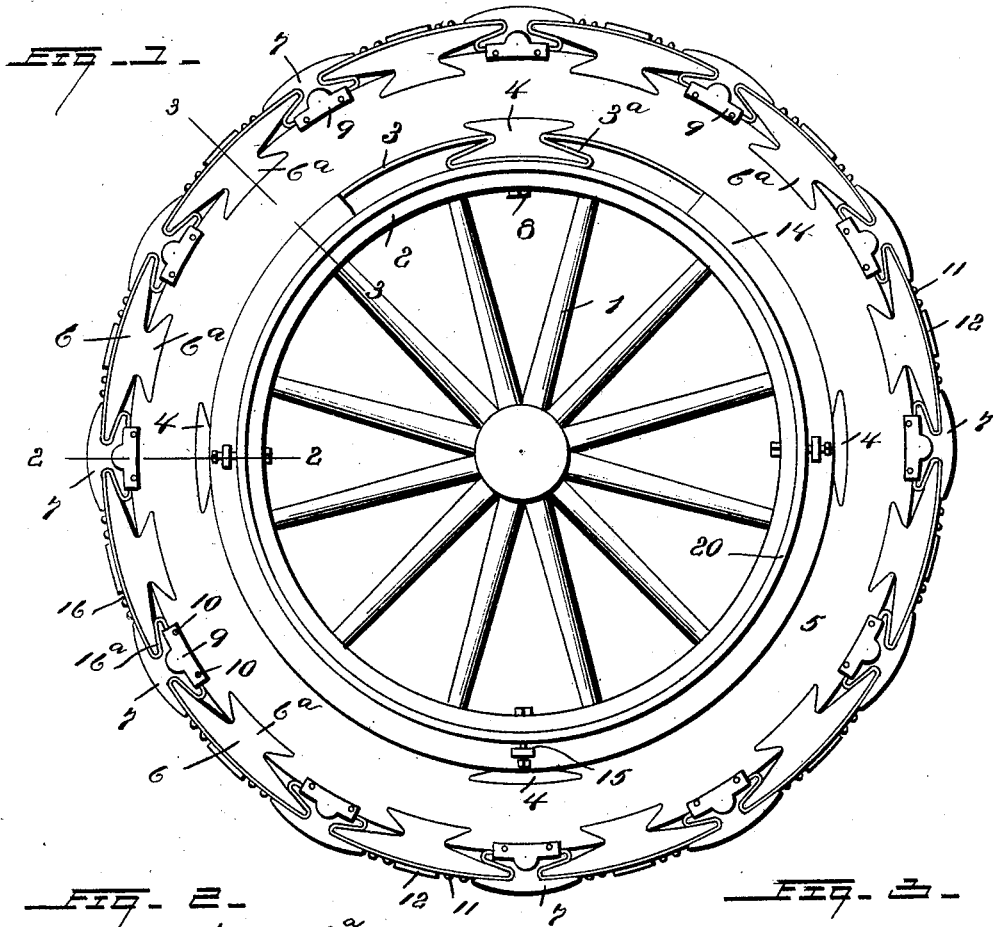
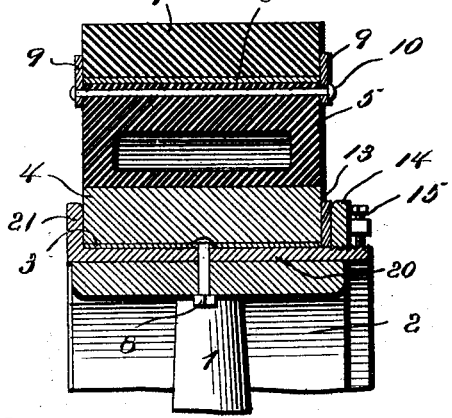
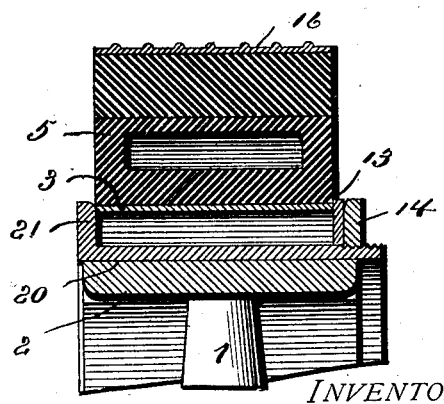

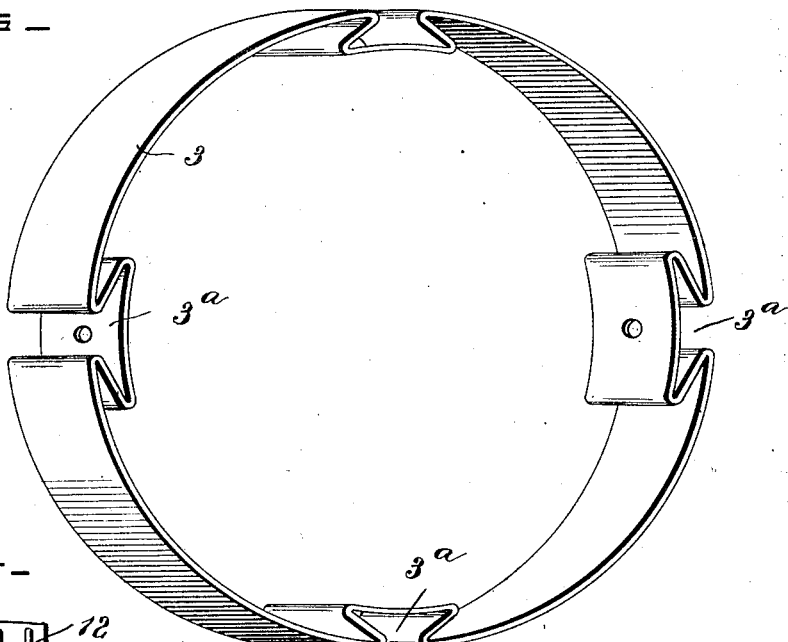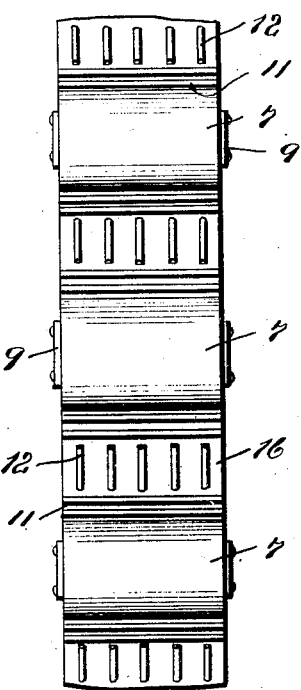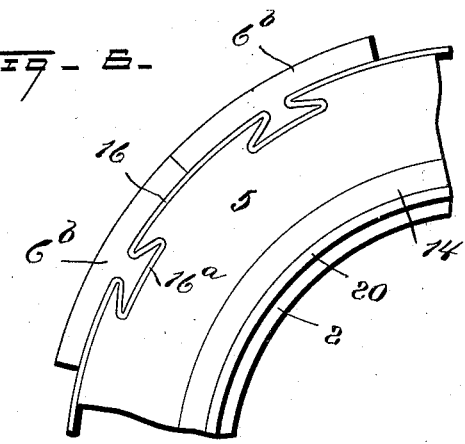

ROBERT WRIGHT, OF CLEVELAND, OHIO.

VEHICLE-TIRE.

No. 818,400.    Specification of Letters Patent.    Patented April 17, 1906.

Application filed July 31, 1905. Serial No. 271,993.

*To all whom it may concern:*

Be it known that I, ROBERT WRIGHT, a citizen of the United States, residing at Cleveland, in the county of Cuyahoga and State of Ohio, have invented new and useful Improvements in Vehicle-Tires, of which the following is a specification.

This invention relates to vehicle-tires particularly suitable for use on automobiles, and includes an armored tire in which the armor may be removed when desired, and also includes means for increasing the resiliency of the tire and for securing the various parts thereof to the wheel-rim. It has the advantages that the armor may be quickly attached and detached, and it can be used without armor, or it may be converted into a solid sectional tire.

In the acccompanying drawings, Figure 1 is a side elevation of a wheel provided with the tire, parts being shown broken away. Fig. 2 is a section on the line 2 2 in Fig. 1. Fig. 3 is a section on line 3 3 of Fig. 1. Fig. 4 is an edge view of part of the tire. Fig. 5 is a perspective view of a metal spring used in the construction of the tire. Fig. 6 is a detail illustrating a modification.

Referring specifically to the drawings, the ordinary wooden spokes of an automobile-wheel are indicated at 1 and the wooden felly at 2. Over the felly is fitted a metal shell or ring 20, which has at one end an outwardly-projecting flange 21 and is threaded at the other end to receive a ring-nut 14 behind a washer 13. The nut is held by screws 15. Mounted on this metal shell 20 is a ribbon-spring 3, (shown in Fig. 5,) provided with a plurality of cross loops or folds, as indicated at $3^a$. These folds are bent or extend inwardly with respect to the circumferential plane of the band or spring and rest upon the shell 20, to which they are fixed by bolts 8, which extend also through the shell and through the felly, as clearly shown in Fig. 2. The band 3 forms a resilient or flexible support for the main rubber tire 5, which is preferably a pneumatic tire. This tire fits upon the outer portions of the band 3 and is held thereon by a series of solid pieces of rubber 4, which have expanded bases fitting within the folds $3^a$ of the spring-band and enlarged heads which fit within appropriate recesses formed in the inner side of the tire 5. These plugs or pieces 4 run entirely across the tire and serve to bind the tire to the spring-band and also to prevent creeping or disarrangement of the tire with respect thereto. Sidewise movement of the tire or the plugs 4 is prevented by the flange 21 and the washer 13 on the ring 20.

In the outer side or periphery of the tire 5 similar expanded or undercut recesses are formed to receive ribs $6^a$, formed on the underside of solid-rubber blocks 6, and fitting upon the blocks 6 is a metal ribbon-spring 16, which forms an armor-plate and which has expanded cross folds or loops $16^a$, extending inwardly therefrom similar to the loops $3^a$ above described, and the laterally-extending portions of these loops fit under the ends of the rubber blocks 6, as shown, whereby the ribbon 16 is held in place. Also fitting within the expanded loops of the band 16 are solid-rubber blocks 7, having enlarged bases to fit the loops and enlarged heads which overhang the ends of the pieces 5. These blocks 7 are prevented from lateral movement by side pieces 9, secured by bolts 10, which extend through the outer portion of the tire 5, as shown clearly in Fig. 2. Between the blocks 7 the band 16 is corrugated crosswise and lengthwise, as indicated at 11 and 12, the purpose of these corrugations being to prevent side slip. The blocks 7 serve to prevent skidding.

The metal band 16 acts as an armor to the tire, and its folded construction, in connection with the solid-rubber blocks, does not interfere with the resiliency of the tire, but rather increases the same. The whole tire can be slipped off the felly by removing the bolts 8 and the ring-nut 14. The armor can be taken off by removing the plates 9, after which the tire 5 can be used without the armor, if desired, particularly by the substitution of the blocks $6^b$, as shown in Fig. 6. These blocks meet at the ends to form a practically solid rim or tire-section. The spring 3 serves to cushion the tire with respect to the rim, and thus, it is believed, will increase the life of the tire and also its resiliency.

What I claim as new, and desire to secure by Letters Patent, is—

1. The combination with a wheel-rim, and a rubber tire, having recesses in its inner wall, of a spring-metal band secured to the rim and extending around between the rim and the tire and having cross-folds expanded to produce enlarged recesses, and plugs with expanded heads and bases fitting in the recesses in the tire and band respectively.

2. The combination with a wheel-rim, of a flat metal ring thereon having a flange at one end and a removable ring-nut at the other, a spring-band having cross-folds, extending around and secured upon the ring, and a rubber tire upon said band.

3. The combination with a wheel-tire, of an armor-band comprising a metal ribbon extending around and secured to the tread of the tire and bent to form a series of cross-loops, and rubber plugs fitting within said loops.

4. The combination with a wheel-tire having undercut cross-recesses in the tread, of an armor thereon having retaining-ribs fitting in said recesses.

5. The combination with a wheel-tire having undercut cross-recesses in the tread, of a metal band extending around the tire and having expanded cross-folds, rubber connecting-plugs fitting in said recesses and in the inner folds, and rubber tread-plugs fitting in the outer folds.

In testimony whereof I have signed my name to this specification in the presence of two subscribing witnesses.

ROBERT WRIGHT.

Witnesses:
JOHN A. BOMMHARDT,
SHIRLEY BOMMHARDT.